United States Patent
Seibt et al.

(10) Patent No.: US 10,589,864 B2
(45) Date of Patent: Mar. 17, 2020

(54) MULTIFUNCTIONAL SUPPORT RAIL

(71) Applicant: Airbus Operations GmbH, Hamburg (DE)

(72) Inventors: Christian Seibt, Hamburg (DE); Jens Wiebalck, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/452,799

(22) Filed: Aug. 6, 2014

(65) Prior Publication Data

US 2015/0048205 A1 Feb. 19, 2015

(30) Foreign Application Priority Data

Aug. 14, 2013 (EP) .................................. 13180480

(51) Int. Cl.
*B64D 11/02* (2006.01)
*B64D 11/00* (2006.01)
(Continued)

(52) U.S. Cl.
CPC ................ *B64D 11/02* (2013.01); *B60N 3/02* (2013.01); *B64D 11/00* (2013.01); *A47K 17/022* (2013.01); *B64D 2011/0038* (2013.01)

(58) Field of Classification Search
CPC ..... B64D 11/02; B64D 11/0607; B64D 11/00; B60N 3/02; B60N 2/245; B60R 3/005; A47K 17/022
(Continued)

(56) References Cited

U.S. PATENT DOCUMENTS 5,065,462 A * 11/1991 Romano .................. A47K 4/00
4/604
5,465,744 A * 11/1995 Browning ....................... 135/67
(Continued)

FOREIGN PATENT DOCUMENTS

CN 102939243 A 2/2013
DE 102007035681 A1 2/2009
(Continued)

OTHER PUBLICATIONS

European Patent Office, Extended European Search Report for European Patent Application No. EP13180480.9 dated Feb. 19, 2014.
(Continued)

*Primary Examiner* — Christopher D Hutchens
(74) *Attorney, Agent, or Firm* — Lorenz & Kopf LLP (57) ABSTRACT

An aircraft cabin is provided that comprises an cabin interior space, a plurality of cabin enclosing surfaces, and a multifunctional support rail. The multifunctional support rail comprises a plurality of rail segments connected to each other forming a continuous rail arrangement. Further a number of first segments are provided as handrail in a first height, and a number of second segments is provided as a support handrail in a second height. The first height is in a waist region of a standing passenger, and the second height is in a shoulder or head region of a standing passenger. Still further, the first segments are connected with the second segments by a number of third segments provided as support handle running in a vertical direction.

20 Claims, 5 Drawing Sheets

(51) Int. Cl.
  *B60N 3/02* (2006.01)
  *A47K 17/02* (2006.01)
(58) Field of Classification Search
  USPC .......................................................... D23/274
  See application file for complete search history.

(56) References Cited

U.S. PATENT DOCUMENTS

| | | | |
|---|---|---|---|
| 5,540,402 A | 7/1996 | Carducci | |
| 5,787,515 A * | 8/1998 | Mason | A47K 17/026 297/217.7 |
| 6,131,213 A * | 10/2000 | Sarff | A47K 3/003 211/105.1 |
| 6,454,209 B1 | 9/2002 | Bock et al. | |
| D487,137 S * | 2/2004 | Itakura | D23/274 |
| D593,646 S * | 6/2009 | Bock | D23/271 |
| 8,484,770 B2 * | 7/2013 | Desai | 4/420 |
| 8,523,126 B2 * | 9/2013 | Garrels | A47K 17/022 211/105.1 |
| 8,534,602 B2 | 9/2013 | Jakubec et al. | |
| 8,613,115 B2 | 12/2013 | Seibt et al. | |
| 9,708,062 B2 * | 7/2017 | Grant | B64D 11/02 |
| 2002/0084403 A1 * | 7/2002 | Okita | A47K 17/022 248/694 |
| 2003/0140571 A1 * | 7/2003 | Muha | A47K 4/00 52/79.1 |
| 2005/0103935 A1 * | 5/2005 | Sprenger | B64D 11/00 244/118.6 |
| 2006/0124802 A1 * | 6/2006 | Ritts et al. | 244/118.5 |
| 2008/0080173 A1 * | 4/2008 | Trimble | E04F 11/18 362/146 |
| 2008/0265092 A1 * | 10/2008 | Cooper et al. | 244/118.5 |
| 2009/0217452 A1 * | 9/2009 | Rubin | A47K 17/022 4/576.1 |
| 2010/0105532 A1 * | 4/2010 | Israeli | A63B 1/00 482/131 |
| 2010/0251472 A1 * | 10/2010 | Culwell | A47K 17/022 4/420 |
| 2012/0248395 A1 * | 10/2012 | Stark | E04F 11/1812 256/59 |
| 2014/0360099 A1 * | 12/2014 | McIntosh | E03D 11/00 49/371 |

FOREIGN PATENT DOCUMENTS

| | | | | |
|---|---|---|---|---|
| EP | 1059230 A2 | | 12/2000 | |
| EP | 1203852 A2 | * | 5/2002 | |
| JP | 07313404 A | * | 12/1995 | |
| JP | H09-192053 | * | 7/1997 | ............ A47K 17/02 |
| JP | 11113805 | * | 4/1999 | |
| JP | 11192189 | * | 7/1999 | |
| JP | 2000316758 A | * | 11/2000 | ............ A47K 17/02 |
| JP | 2000320100 | * | 11/2000 | |
| JP | 2003174983 A | * | 6/2003 | ........... A47K 17/022 |
| JP | 2004298451 | * | 10/2004 | |
| JP | 2005-111114 | * | 4/2005 | ........... A47K 17/022 |
| JP | 2005111114 | * | 4/2005 | |
| JP | 2005137699 | * | 6/2005 | |
| JP | 2008284045 A | * | 11/2008 | |

OTHER PUBLICATIONS

State Intellectual Property Office of the Peoples Republic of China, Office Action in Chinese Patent Application No. 201410400153.5 dated Nov. 27, 2015.

* cited by examiner

MULTIFUNCTIONAL SUPPORT RAIL

CROSS-REFERENCE TO RELATED APPLICATIONS

This application claims priority to European Patent Application No. 13 180 480.9, filed Aug. 14, 2013, which is incorporated herein by reference in its entirety.

TECHNICAL FIELD

The technical field relates to support rails on board an aircraft, and relates in particular to an aircraft cabin and an aircraft.

BACKGROUND

Since an aircraft may be exposed to sudden movements during air travel, for example due to turbulences, different support elements are provided throughout the aircraft cabin, acting as support portions or support grips or holds for the passengers. For example, the upper portions of the seats, i.e. the seat rests, can be grasped by a user when moving along the aisle. Further, inside a lavatory, various handle or support elements are provided, for example for supporting normal user groups and special user groups such as passengers with reduced mobility. However, it has been shown that providing different support elements means additional effort, such as additional mounting steps as well as additional material. Further, support elements have to be highlighted in order to be found by the user in case of a sudden need for providing a secure hold.

In addition, other objects, desirable features and characteristics will become apparent from the subsequent summary and detailed description, and the appended claims, taken in conjunction with the accompanying drawings and this background.

SUMMARY

Accordingly, there may thus be a need to provide improved support for passengers on board an aircraft.

It should be noted that the following described aspects of the present disclosure apply also for the aircraft cabin and for the aircraft.

According to one of various aspects of the present disclosure, an aircraft cabin is provided that comprises a cabin interior space, a plurality of cabin enclosing surfaces, and a multifunctional support rail. The multifunctional support rail comprises a plurality of rail segments connected to each other forming a continuous rail arrangement. A number of first segments is provided as handrail in a first height, and a number of second segments is provided as a support handrail in a second height. The first height is in a waist region of a standing passenger, and the second height is in a shoulder or head region of a standing passenger. The first segments are connected with the second segments by a number of third segments provided as support handle running in a vertical direction.

The first segments and the second segments are provided in a displaced manner in a basic example. In other words, the lower guide rail is provided in front of a wall or surface portion and the upper guide rail is arranged in an adjacent portion. In an option, it is provided that in addition to the first or the second height, a guide rail is also provided in the other respective height.

As an advantage, different handle or support segments are provided in different heights allowing the provision of sufficient and safe support portions for a passenger. The connection of the handrail and the support handrail in the two different heights by the third segments allows a facilitated handling during the manufacturing steps, and also ensures proper support and hold of the continuous rail arrangement and provide further support locations.

The "cabin enclosing surfaces" are provided as wall surfaces and equipment surfaces. The term "cabin enclosing surfaces" relates to structural components such as walls, e.g. separating walls or partition walls, interior panels, lining panels. The term also comprises enclosing surfaces of installed equipment such as wardrobes, cabinets, lockers and storage compartments. These can be provided in front of wall segments or can be provided acting also as wall segments in relation with the separation function of a wall.

The rail segments are provided as connected linear segments, e.g. tubular segments. In an example the multifunctional support rail is a tubular handle system with connected tubes arranged in the cabin interior space.

The multifunctional support rail is provided with colour and/or brightness contrast to the surrounding wall surfaces for improved visibility in one example.

According to an example, at least a part of the segments is provided with illumination means.

For example, direct light can be emitted to illuminate the multifunctional support rail and the surrounding space. In another example, light is emitted at portions of the multifunctional support rail facing away from the passenger, wherein the light is shining on adjacent wall surfaces, thus providing indirect illumination.

According to an example, the multifunctional support rail comprises at least one of the groups of communication interfaces and operation interfaces.

In an example, the communication interfaces relate to indications of the different functions in the lavatory, such as providing information in a communicative way to the user, for example visually, or, as an addition or alternative, in a tactile manner or acoustically. For example, the different functions relate to basic functions of a lavatory, such as toilet use, e.g. indication the function of toilet flushing, handling of a toilet seat and cover, or use of a wash-basin, e.g. provision of water, washing liquid and hand drying means, such as paper towels or hand hot air dryers, or other commodities, such as light or ventilation.

In an example, the operation interfaces relate to interfaces for activating and de-activating different technical supply means or service functions in the lavatory. The operation interfaces are hence provided for activating functions such as the toilet flushing, toilet seat cleaning, ventilation, or the like.

According to an example, the cabin interior space is a lavatory space. The first segments are provided as a horizontal edge handrail along lavatory equipment comprising at least one of the groups of a wash basin and a lavatory table surface. The second segments are provided as an above-head handhold along a wall region adjacent to a seating area or a standing area. The third segments are provided as a vertical support handle in vicinity of a toilet seat for support during transfer positions.

The term "above-head handhold" relates to a rail portion arranged at least in a user's head region, e.g. above a user's head when sitting on a lavatory.

The vertical support handle is arranged in a corner portion of the lavatory space, for example.

According to an example, the multifunctional support rail is provided throughout at least a major part of the cabin interior space as a multi-position handhold.

In an example, the multifunctional support rail is provided along a circumferential line extending over at least over half of the enclosing circumferential surfaces of the cabin interior space, in one example, over at least approximately (hereinafter "app.") 75% of the enclosing circumferential surfaces.

The term "circumferential line" relates to a (virtual) line that runs along all enclosing surfaces, such as wall surfaces, door or window surfaces, and which line thus runs along the spatial contour of the lavatory space describing a sort of plan view or horizontal cross section of the lavatory space.

In an example, the multifunctional support rail is provided extending along the complete (virtual) circumferential line. The multifunctional support rail runs along the complete extension of the interior surfaces, for example in the first and/or second height.

In a further example, the waist region of a standing passenger comprises a height with a range of app. 700 millimeters (mm) to app. 1300 mm above the upper floor surface, in one example, a range of app. 800 mm to app. 1200 mm; and the shoulder or head region of a standing passenger comprises a height with a range of app. 1500 mm to app. 2100 mm above the upper floor surface, in one example, a range of app. 1600 mm to app. 2000 mm. For example, the waist region of a standing passenger comprises a height range of app. 900 mm to app. 1100 mm above the upper floor surface; and the shoulder or head region of a standing passenger comprises a height range of app. 1700 mm to app. 1900 mm.

According to an example, the second segments are provided as dual height handhold with first sub-segments in a first upper height and with second sub-segments in a second upper height.

According to an example, the first and second sub-segments are arranged as stretching handholds above a seating device in the lavatory space.

In an example, the first upper height is reachable by a $5^{th}$ percentile-Japanese-female when sitting on a toilet seat or on a seat arrangement in the lavatory space, and also when standing upright. The second upper height is reachable by a $95^{th}$ percentile US-male when sitting on a toilet seat or on a seat arrangement in the lavatory space, and also when standing upright.

In an example, the multifunctional support rail provides handhold portions for different workouts, for a variety of physical exercises.

In an example, the first upper height comprises a height range of app. 1400 mm to app. 1900 mm, for example a range of app. 1500 mm to app. 1800 mm, such as app. 1650 mm; and the second upper height comprises a height range of app. 1600 mm to app. 2100 mm, for example a range of app. 1700 mm to app. 2000 mm, such as app. 1850 mm.

According to an example, the second segments are provided as dual height rail supports with first sub-segments as first stowage supports in a first upper height and with second sub-segments as second stowage supports in a second upper height.

In an example, the stowage supports are provided as supports for at least one of the group of towels, sanitary items, handbags and clothing. The handhold function can be provided in parallel.

According to an example, the second segments are provided as height adaptable segments for arranging the second segments at least in a first position in a first height and a second position in a second height.

According to an example, the multifunctional support rail follows a contour of the interior space.

The term "contour" relates to the inner shape of the cabin space enclosing surfaces of equipment, wall surfaces and the like. The term "follow" relates to an approximate parallel arrangement of the multifunctional support rail in relation to the adjacent wall or enclosing surface. For example, the multifunctional support rail is arranged displaced from the wall or other equipment surface in a distance sufficiently wide to allow a grasping of the rail by hand.

According to an example, along corner portions of the interior structure, wider bending radii are provided to arrange cantilevering/free-spanning handle segments that are graspable by a user along the complete circumference of the cross-section.

Thus, a variety of holding positions is provided.

According to an example, the multifunctional support rail provides support handle portions for persons with reduced mobility.

The term "persons with reduced mobility" (PRM) relates to passengers that are handicapped in their ability to move onboard an aircraft. For example, persons with reduced mobility can belong to the group of handicapped passengers or elderly passengers, or passengers that are otherwise limited in their capability to move.

According to an example, the above-head handhold inside a lavatory space is arranged in the same height as a lower front edge of overhead compartments of a cabin interior of a main passenger cabin area.

In an example, the lower front edge of overhead compartments is provided as a handhold or guide rail.

The term "same" comprises a deviation of up to 15% e.g. up to 10% or up to 5%.

According to one of various aspects of the present disclosure, also an aircraft is provided, comprising a fuselage structure and at least one cabin area. The at least one cabin area is arranged in the fuselage structure, and the cabin area is provided as an aircraft cabin according to one of the above-mentioned examples with a multifunctional support rail.

According to one of various aspects of the present disclosure, a support system comprises a multifunctional support rail that provides different types of function. As a major function, support elements for a secure hold of passengers onboard an aircraft during travel is provided. As a further function, the arrangement of second segments in an upper height also allows the exercise of physical training units that are of particular interest during long-range flights. Further, the multifunctional support rail can also be used for attaching a shelf or other elements for providing user-related items, such as towels in a first class lavatory, for example. The connection of upper and lower rails allows a stable support with facilitated, namely reduced, fixation means due to providing a continuous rail arrangement.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
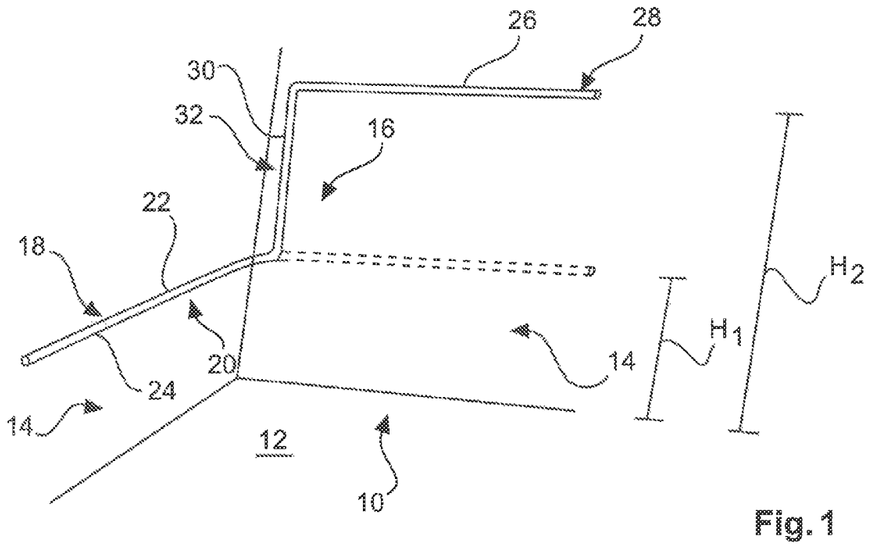
FIG. 1 shows a perspective view of an aircraft cabin comprising a multifunctional support rail with upper and lower support segments according to various embodiments.

FIG. 1 shows aircraft cabin 10 in a schematic perspective view, comprising a cabin interior space 12 and a plurality of cabin enclosing surfaces 14. Further, a multifunctional support rail 16 is provided. The multifunctional support rail 16 comprises a plurality of rail segments 18 connected to each other, forming a continuous rail arrangement 20. A number of first segments 22 are provided as handrail 24 in a first height $H_1$, and a number of second segments 26 are provided as a support handrail 28 in a second height $H_2$. The first height $H_1$ is in a waist region of a standing passenger, and the second height $H_2$ is in a shoulder or head region of a standing passenger. The first segments 22 are connected with the second segments 26 by a number of third segments 30 provided as a support handle 32 running in a vertical direction.

In a basic concept, a lower and an upper height segment part are provided next to each other on two different wall or enclosure portions. In other words, when projected onto the ground, the segments are provided next to each other, i.e. linear, connected by the approximately vertical third segments. As indicated by dotted lines, in an option a lower segment portion is provided in addition to the upper segments, or upper segments are provided in addition to the lower segments.

Figure 2:
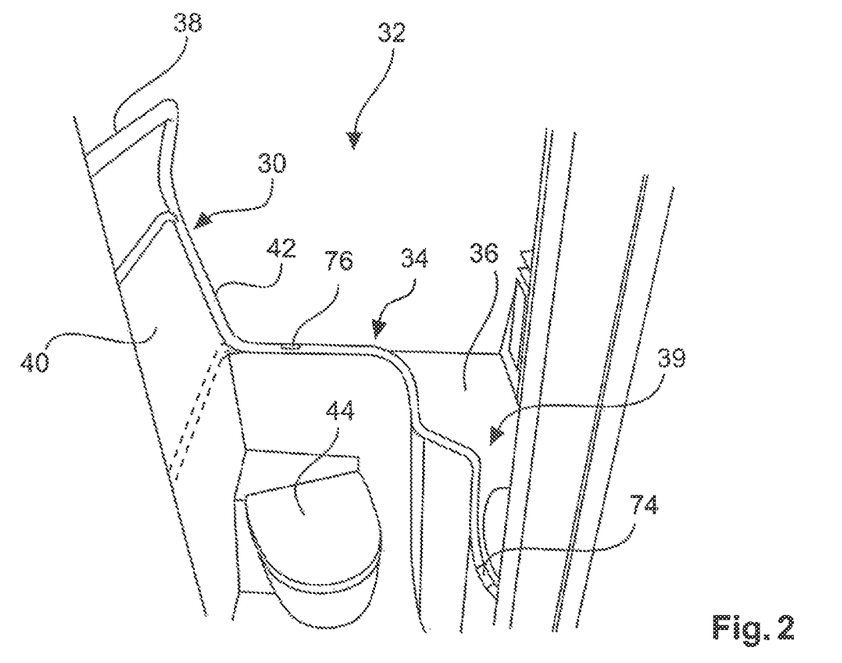
FIG. 2 shows a further perspective view of an example of an aircraft cabin with a multifunctional support rail according to various embodiments.

FIG. 2 shows an example where the cabin interior space 12 is a lavatory space 32. The first segments 22 are provided as a horizontal edge handrail 34 along lavatory equipment 36 comprising at least one of the groups of a wash basin and a lavatory table surface 39. The second segments 26 are provided as an above-head handhold 38 along a wall region 40 adjacent to a seating area (not further shown) or a standing area (not further shown). The third segments 30 are provided as a vertical support handle 42 in vicinity of a toilet seat 44 for support during transfer positions, for example persons with reduced mobility.

In an example, the multifunctional support rail 16 comprises at least one of the groups of communication interfaces 74 and operation interfaces 76, as indicated in FIG. 2. The communication interfaces 74 may be provided as indications of the different functions in the lavatory. The operation interfaces 76 may be provided for activating functions such as the toilet flushing.

As shown in FIG. 2, in an example, the multifunctional support rail 16 is provided throughout at least a major part of the cabin interior space as a multi-position handhold.

According to an example, the multifunctional support rail 16 follows a contour of the interior space.

Figure 3A:
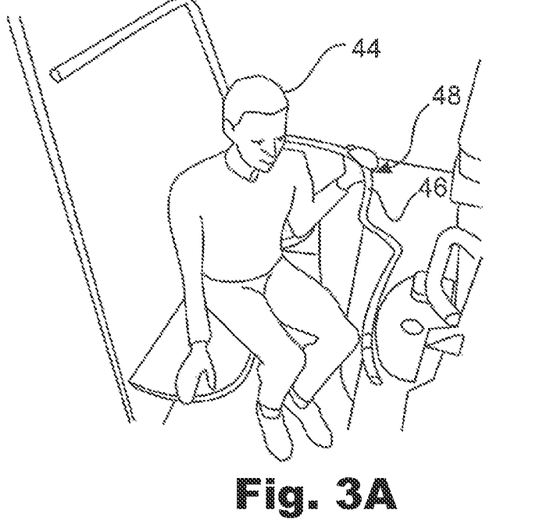
FIG. 3A shows a further perspective view with a person with reduced mobility in a first state during transfer from a seat to a toilet, and vice versa.
Figure 3B:
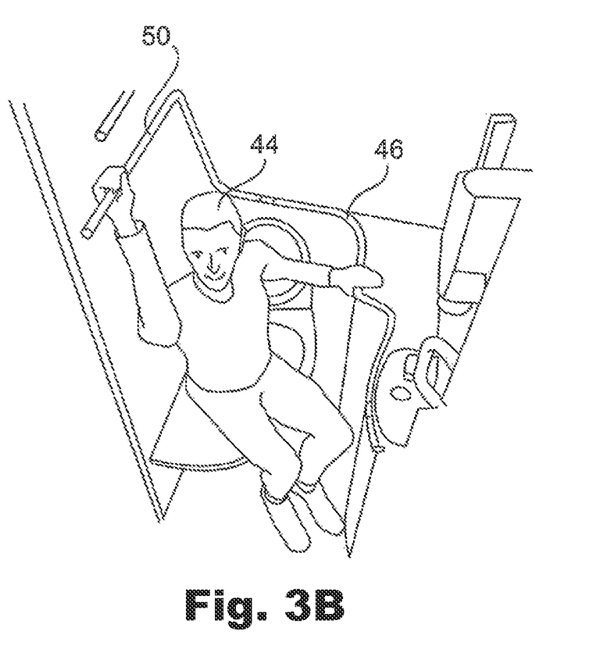
FIG. 3B shows a further state of the person during transfer.

FIG. 3A shows a person with reduced mobility 44 grasping a corner section 46 with a wider bending radius, provided as cantilevering/free-spanning handle segments 48 that are graspable by a user along the complete circumference of the cross-section. FIG. 3B shows the person with reduced mobility 44 grasping an upper segment 50 for further transfer purposes.

Figure 4A:
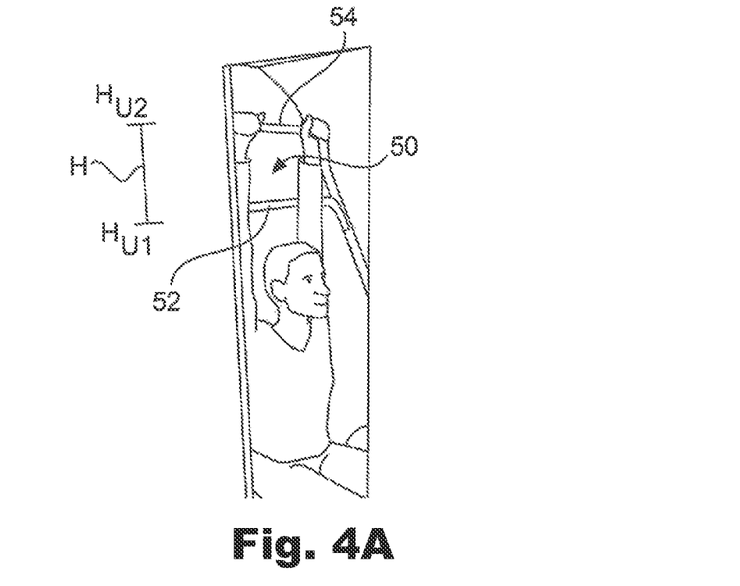
FIG. 4A shows a perspective view of a taller passenger stretching/relaxing with means of the multifunctional support rail.
Figure 4B:
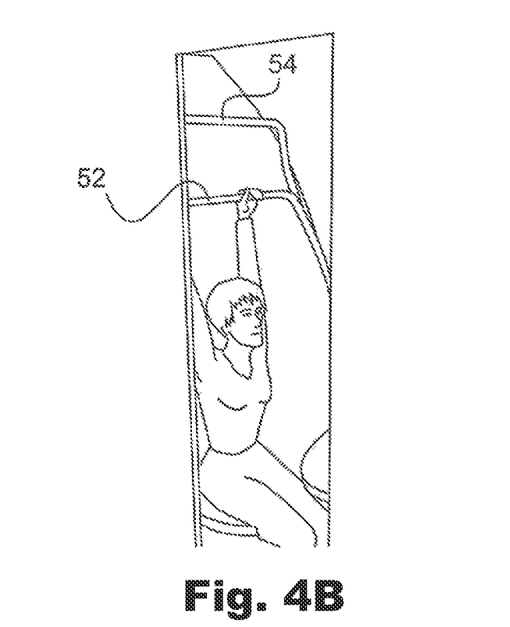
FIG. 4B shows a further example of a smaller person using a multifunctional support rail with dual height handholds.

As indicated in FIG. 4A, in an example, the multifunctional support rail 16 comprises the second segments 26 provided as dual height handhold 50 with first sub-segments 52 in a first upper height $H_{U1}$, and with second sub-segments 54 in a second upper height $H_{U2}$. As also indicated in FIG. 4A, in an example, the first and second sub-segments 52, 54 are arranged as stretching handholds 56 above a seating device 58 in the lavatory space. FIG. 4B shows a further person, for example a smaller female person, such as a $5^{th}$ percentile Japanese-female, grasping the first sub-segment 52, whereas the larger male person, such as a $95^{th}$ percentile-US-male, in FIG. 4A grasps the (upper) second sub-segment 54.

Figure 5:
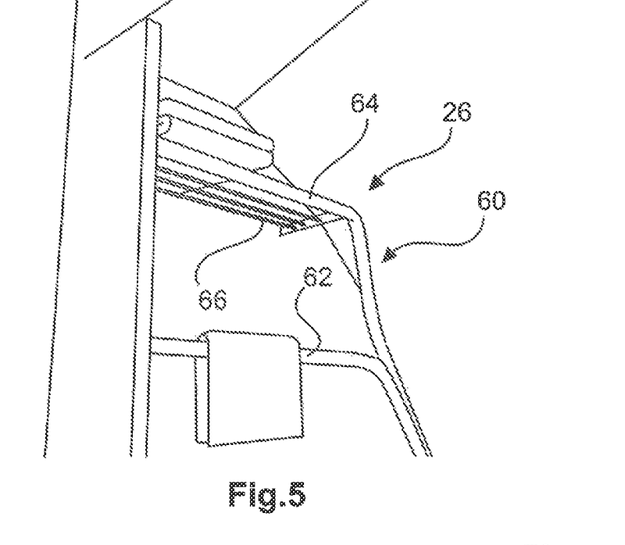
FIG. 5 shows the upper portion of the multifunctional support rail providing additional stowage function.

FIG. 5 shows a further example, where the second segments 26 are provided as dual height rail supports 60 with first sub-segments 62 as first stowage supports in a first upper height and with second sub-segments 64 as second stowage supports in a second upper height.

Figure 6:
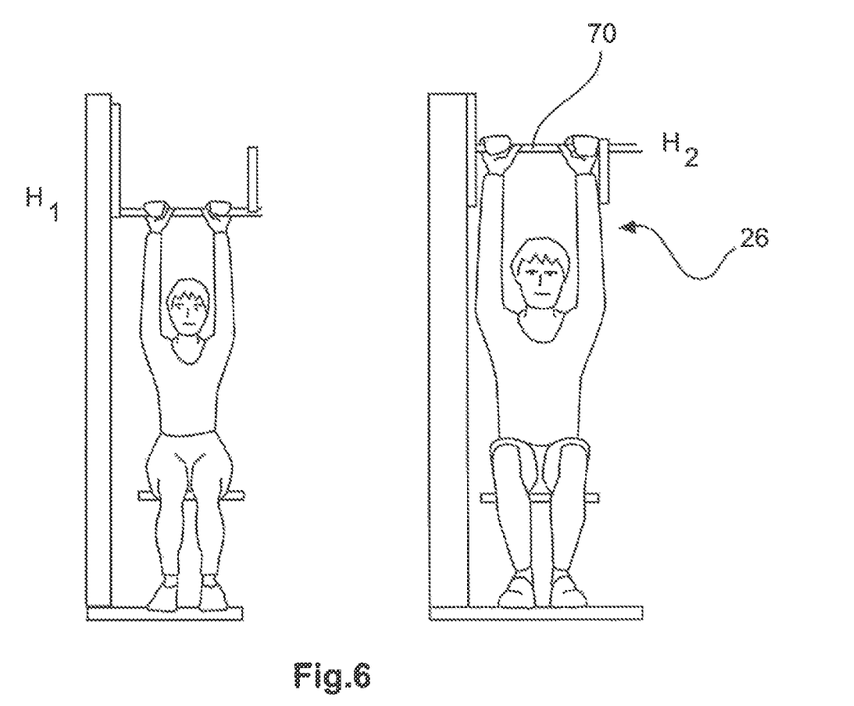
FIG. 6 shows a height-adaptable segment of the multifunctional support rail it different heights.

FIG. 6 shows a further example, where the second segments 26 are provided as height adaptable segments 70 for arranging the second segments at least in a first position in a first height and a second position in a second height.

Figure 7:
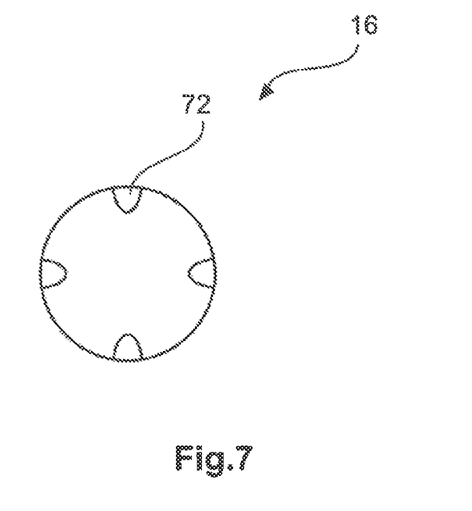
FIG. 7 shows a cross-section through one of the segments of the multifunctional support rail with illumination means.

According to an example, FIG. 7 shows the multifunctional support rail 16 in a cross-section. A part of the segments is provided with illumination means 72, for example for direct and indirect light emission.

Figure 8:
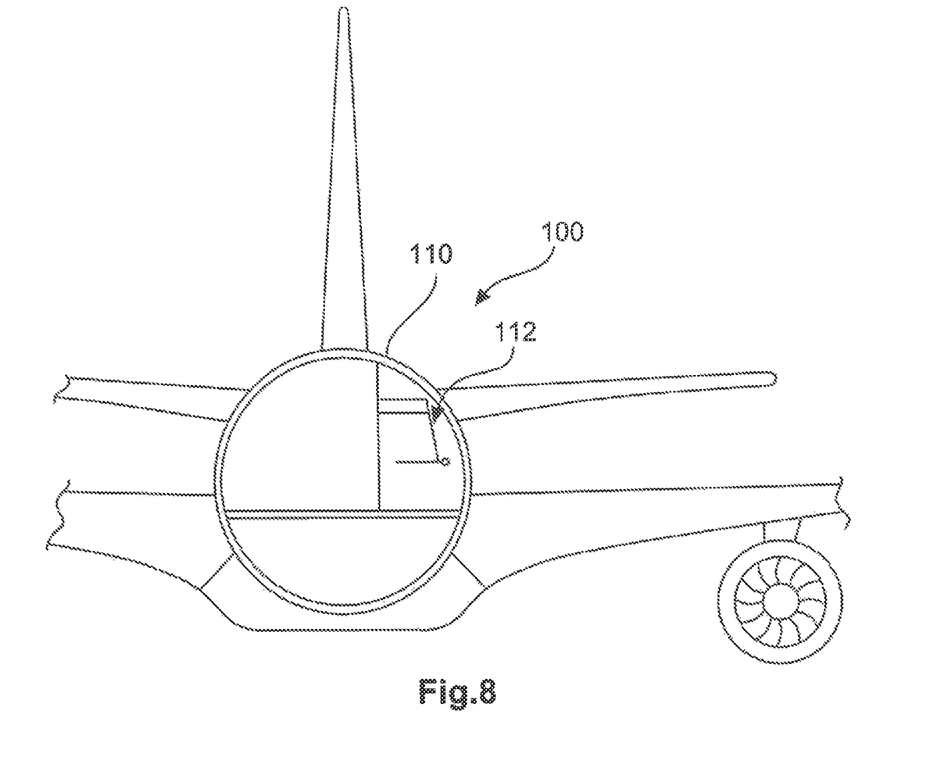
FIG. 8 shows an example of an aircraft comprising a cabin area with a multifunctional support rail.

FIG. 8 shows an aircraft 100 comprising a fuselage structure 110 and at least one cabin area 112. The at least one cabin area 112 is arranged in the fuselage structure 110. The cabin area is provided as an aircraft cabin 10 according to one of the above-mentioned examples with a multifunctional support rail 16.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An aircraft cabin, comprising:
   a plurality of vertical lavatory enclosing surfaces including two adjacent side walls abutting at a corner region and including an opposite side wall, wherein the plurality of vertical lavatory enclosing surfaces completely encloses a lavatory interior space including a seating or standing area;
   an upper floor surface;
   a toilet seat in the lavatory interior space adjacent the corner region;
   lavatory equipment comprising a wash basin and/or a lavatory table surface located in the lavatory interior space along the opposite side wall; and
   a multifunctional support rail including a plurality of rail segments connected to each other forming a continuous rail arrangement, the plurality of rail segments including:
      first handrail segments provided as a first horizontal handrail at a first height in a waist region of a standing passenger in a range of approximately 700 mm to approximately 1300 mm above the upper floor surface, wherein at least a portion of the first handrail segments are provided as a horizontal edge handrail along the lavatory equipment located along the opposite side wall,
      second handrail segments provided as a second horizontal handrail in a second height in a shoulder or head region of the standing passenger in a range of approximately 1500 mm to approximately 2100 mm above the upper floor surface, wherein at least a portion of the second segments are provided as an above-head handhold parallel to the upper floor surface and extending along and parallel to one of the adjacent side walls, and
      third handrail segments provided as a support handle running in a vertical direction along at least one of the adjacent side walls and interconnecting the first handrail segments to the second handrail segment, wherein at least a portion of the third segments are provided as a vertical support handle in the vicinity of a toilet seat for support when transferring positions; wherein the multifunctional support rail comprises communication interfaces and/or operation interfaces arranged on the multifunctional support rail;
   wherein the multifunctional support rail is provided throughout at least a major part of the lavatory interior space as a multi-position handhold; and wherein the multifunctional support rail is provided along a circumferential line extending over at least half of the enclosing circumferential surfaces of the lavatory interior space.

2. The aircraft cabin according to claim 1, wherein the second handrail segments are provided as a dual height handhold with first sub-segments in a first upper height and with second sub-segments in a second upper height.

3. The aircraft cabin according to claim 2, wherein the first sub-segments and second sub-segments are arranged as stretching handholds above a seating device in the lavatory interior space.

4. The aircraft cabin according to claim 1, wherein the second handrail segments are provided as dual height rail supports with first sub-segments as first stowage supports in a first upper height and with second sub-segments as second stowage supports in a second upper height.

5. The aircraft cabin according to claim 1, wherein the second handrail segments are adjustable from between a first position at a lower height and a second position at an upper height.

6. The aircraft cabin according to claim 1, wherein the multifunctional support rail follows a contour of the interior space.

7. The aircraft cabin according to claim 1, wherein the plurality of lavatory enclosing surfaces define an interior structure, and along corner portions of the interior structure, the first handrail segments are provided with wider bending radii to arrange free-spanning handle segments that are graspable by a user along the complete circumference of the cross-section of the handle segments.

8. The aircraft cabin according to claim 1, wherein the multifunctional support rail provides support handle portions for persons with reduced mobility.

9. The aircraft cabin according to claim 1, wherein at least a portion of the plurality of rail segments is provided with illumination means.

10. The aircraft cabin according to claim 1, wherein the above-head handhold is arranged in the same height as a handrail along overhead compartments of a cabin interior of a main passenger cabin area.

11. The aircraft cabin according to claim 1, wherein the multifunctional support rail is provided along a circumferential line extending over at least approximately 75% of the enclosing circumferential surfaces.

12. The aircraft cabin according to claim 1, wherein the above-head handhold is located directly over the toilet seat.

13. The aircraft cabin according to claim 1, wherein:
   the opposite side wall is a second opposite side wall;
   the plurality of vertical lavatory enclosing surfaces further includes a first opposite side wall;
   the two adjacent side walls includes a first adjacent side wall and a second adjacent side wall;
   the first adjacent side wall extends from the corner region to a first opposite side wall;
   the second adjacent side wall extends from the corner region to the second opposite side wall;
   and the above-head handhold extends from the support handle along and parallel to the first adjacent side wall into contact with the first opposite side wall.

14. The aircraft cabin according to claim 13, wherein:
   the second handrail segments are provided as a dual height handhold with first sub-segments in a first upper height and with second sub-segments in a second upper height;
   the first sub-segments are parallel to the upper floor surface and extend along and parallel to the first adjacent side wall from the support handle into contact with the first opposite side wall; and
   the second sub-segments are parallel to the upper floor surface and extend along and parallel to the first adjacent side wall from the support handle into contact with the first opposite side wall.

15. An aircraft, comprising:
   a fuselage structure having a floor;
   a lavatory space arranged over the floor in the fuselage structure and including a first adjacent side wall abutting a second adjacent side wall at a corner, wherein the first adjacent side wall extends from the corner to a first opposite side wall, and wherein the second adjacent side wall extends from the corner to a second opposite side wall;

a toilet mounted to the corner;

a lavatory table mounted to the second opposite side wall; and a multifunctional support rail extending continuously from the first opposite side wall to the second adjacent side wall, along the second adjacent side wall to the first adjacent side wall, and along the first adjacent side wall to the first opposite side wall, the support rail including a waist height handrail, an above-head handhold and a vertical support handle, wherein:

the waist height handrail extends parallel to the floor at a height of from about 700 to about 1300 mm above the floor along an edge of the lavatory table on the second opposite side wall from the second adjacent side wall toward the first opposite side wall;

the above-head handhold extends parallel to the floor at a height of from about 1500 to about 2100 mm above the floor along the first adjacent side wall from the corner toward the first opposite side wall, wherein a portion of the above-head handhold is directly over the toilet; and the vertical support handle interconnects the waist height handrail and the above-head handhold and extends upward from the waist height handrail to the above-head handhold along the first adjacent side wall.

16. The aircraft according to claim 15, wherein at least a portion of the support rail is provided with illumination means.

17. The aircraft according to claim 15, wherein at least a portion of the support rail is provided with a communication and/or operation interface.

18. The aircraft according to claim 15, further comprising a transfer seat located along the first adjacent side wall between the toilet seat and the first opposite side wall, wherein the above-head handhold extends directly over the toilet seat and the transfer seat.

19. The aircraft according to claim 15, wherein:

the above-head handhold is provided as a dual height handhold with an upper handrail and a lower handrail;

the upper handrail is parallel to the upper floor surface and extends along and parallel to the first adjacent side wall from the support handle into contact with the first opposite side wall; and the lower handrail is parallel to the upper floor surface and extends along and parallel to the first adjacent side wall from the support handle into contact with the first opposite side wall.

20. The aircraft according to claim 15, wherein:

the above-head handhold is provided as a dual height handhold with an upper handrail and a lower handrail;

the upper handrail is parallel to the upper floor surface and extends along and parallel to the first adjacent side wall from the support handle toward the first opposite side wall;

the lower handrail is parallel to the upper floor surface and extends along and parallel to the first adjacent side wall from the support handle toward the first opposite side wall; and the support rail consists of three ends: a first end of the waist height handrail, a second end of the upper handrail, and a third end of the lower handrail.

* * * * *